US006748976B2

(12) United States Patent
Sato et al.

(10) Patent No.: US 6,748,976 B2
(45) Date of Patent: Jun. 15, 2004

(54) ELECTROMAGNETIC VALVE

(75) Inventors: Hideharu Sato, Tsukuba-gun (JP); Yoshio Aso, Tsukuba-gun (JP); Shinichi Yoshimura, Tsukuba-gun (JP); Takumi Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 67 days.

(21) Appl. No.: 10/197,558

(22) Filed: Jul. 18, 2002

(65) Prior Publication Data

US 2003/0029509 A1 Feb. 13, 2003

(30) Foreign Application Priority Data

Aug. 13, 2001 (JP) ....................................... 2001-245728

(51) Int. Cl.[7] ......................... F15B 13/044; F16K 31/06
(52) U.S. Cl. .............................. 137/625.65; 251/129.15
(58) Field of Search ................. 137/625.65; 251/129.15

(56) References Cited

U.S. PATENT DOCUMENTS 3,934,815 A 1/1976 Marsden
4,418,720 A * 12/1983 Day et al. .............. 137/625.65
4,574,843 A * 3/1986 Loup et al. ............ 137/625.65
5,441,233 A 8/1995 Asou et al.

FOREIGN PATENT DOCUMENTS

EP 0 726 583 8/1996

* cited by examiner

*Primary Examiner*—Gerald A. Michalsky
(74) *Attorney, Agent, or Firm*—Oblon, Spivak, McClelland, Maier & Neustadt, P.C.

(57) ABSTRACT

To provide an electromagnetic valve where constitution and assembling of a current conduction system to a solenoid portion is simplified to improve assembling easiness and an insulation performance of the current conduction system can easily be secured. In an electromagnetic valve provided with a valve portion 1 having a valve body switching flow paths according to approach to/separation from a valve seat in a housing 10 and a solenoid portion 2 driving the valve body, the housing 10 is formed from electrically insulating synthetic resin, a current conduction terminals 40 constituting a current conduction system of the solenoid portion is inserted into a terminal insertion hole 45 opened on a joining face 10*a* of the housing 10 with the solenoid portion 2 so that the solenoid portion and the valve portion are fixed to each other, and an opening 48 through which contact terminals 53 extend front the outside to the current conduction terminals 40 in the terminal insertion hole 45 to be electrically connected thereto is provided in the housing.

7 Claims, 8 Drawing Sheets

2
3
34
50
51
52
31
30
35
10a
47
45
40
62
56
53
48
1
10

ELECTROMAGNETIC VALVE

TECHNICAL FIELD

The present invention relates to an electromagnetic valve where configuration and assembling of a current conduction system is simplified.

PRIOR ART

In an electromagnetic valve provided with a valve portion having a valve body switching flow paths according to approaching to/separating from a valve seat in a valve main body and a solenoid portion which drives the valve body in directions of approaching to/separating from the valve seat, a current conduction terminal conducting current to the solenoid portion is normally derived to the outside from between a yoke provided outside a coil in the solenoid portion and the coil.

For this reason, it becomes necessary to provide means for electrically insulating a current conduction terminal in the solenoid portion to derive it to the outside, which results in requirement for much labor and time in assembling the means. Also, in particular, in a case that the electromagnetic valve is formed in a water-proof/drip-proof type, it is necessary to consider special means for liquid-tight treatment of the deriving portion of the current conduction terminal in the solenoid portion. Therefore, such a problem occurs that the structure required therefor is complicated and much time and labor are required for assembling work.

DISCLOSURE OF THE INVENTION

A technical problem of the present invention is to provide an electromagnetic valve where a configuration and an assembling of a current conduction system to a solenoid portion are simplified and an assembling easiness has been improved eventually.

A further specific technical problem of the present invention is to provide an electromagnetic valve where insulating properties of a solenoid portion and its current conduction system can easily be secured.

Another technical problem of the present invention is to provide an electromagnetic valve where an insulating structure of a current conduction system to a solenoid portion is simplified by utilizing an electrical insulation performance of a valve main body made from synthetic resin effectively.

Another technical problem of the present invention is to provide an electromagnetic valve where a water-proof/drip-proof property of a solenoid portion and its current conduction system can easily be secured.

An electromagnetic valve of the present invention for solving the above problem is an electromagnetic valve comprising a valve portion having a valve body for switching flow paths according to approach to/separation from a valve seat within a valve main body and a solenoid portion which drives the valve body so as to approach to/separate from the valve seat, wherein the valve main body is formed from an electric insulating synthetic resin; in a state where a current conduction terminal constituting a current conduction system of the solenoid portion has been inserted into a terminal insertion hole opened in a contact face with a solenoid in the valve main body, the solenoid portion and the valve portion are fixed to each other; and an opening for inserting a contact terminal which extends from the outside to the current conduction terminal in the terminal insertion hole to be electrically connected thereto is provided in the valve main body.

In a preferable embodiment of the electromagnetic valve of the present invention, the contact terminal is provided to a terminal box mounted to the valve portion and/or the solenoid portion; a terminal block constituting a base portion of the terminal box is fixed to the solenoid portion, and a connector for connecting the contact terminal connected to the current conduction terminal to an electronic part for a current conduction circuit and an external power source is provided in a board assembly mounted on the terminal block; and a contact terminal for connecting to a current conduction terminal provided in the board assembly is formed by a pair of resilient contact pieces which are elastically inserted through an opening communicating with the terminal insertion hole of the solenoid in the valve main body from the outside of the valve main body to hold the current conduction terminal in the terminal insertion hole.

In the electromagnetic valve having the above configuration, the valve main body is formed from the electrically insulating synthetic resin, the solenoid portion and the valve portion are fixed to each other in the state where the current conduction terminal to the solenoid portion has been inserted into the terminal insertion hole in the valve main body, a contact terminal provided in an external terminal box or the like is brought into contact with the current conduction terminal in the terminal insertion hole, further preferably, the contact terminal is formed by a pair of resilient contact pieces such that the contact pieces are inserted through an opening communicating with the terminal insertion hole of the valve main body to hold the current conduction terminal in the terminal insertion hole, so that the configuration and the assembling of the current conduction system to the solenoid portion can be simplified. In addition, by utilizing the valve main body comprising the electrically insulating synthetic resin effectively, a function serving as a housing of the connection portion of the current conduction terminal and the contact terminal is imparted to a portion of the valve main body, so that the insulating structure of the current conduction system of the valve main body is remarkably simplified and the insulation performance can easily be secured.

Furthermore, in the electromagnetic valve of the present invention, the magnetic cover provided outside the coil in the solenoid portion is formed in such a shape as to constitute an outer shell of the solenoid portion to cover it in a liquid-tight manner, the valve main body is fixed to the opening end side of the magnetic cover in a liquid-tight manner, and the contact terminal connected to the current conduction terminal can be inserted into the opening of the valve main body in a liquid-tight manner, so that a water-proof/drip-proof properties of the solenoid portion and its current conduction system in the electromagnetic valve can easily be secured.

BRIEF DESCRIPTION OF THE DRAWIGNS

DETAILED DESCRIPTION

Figure 1:
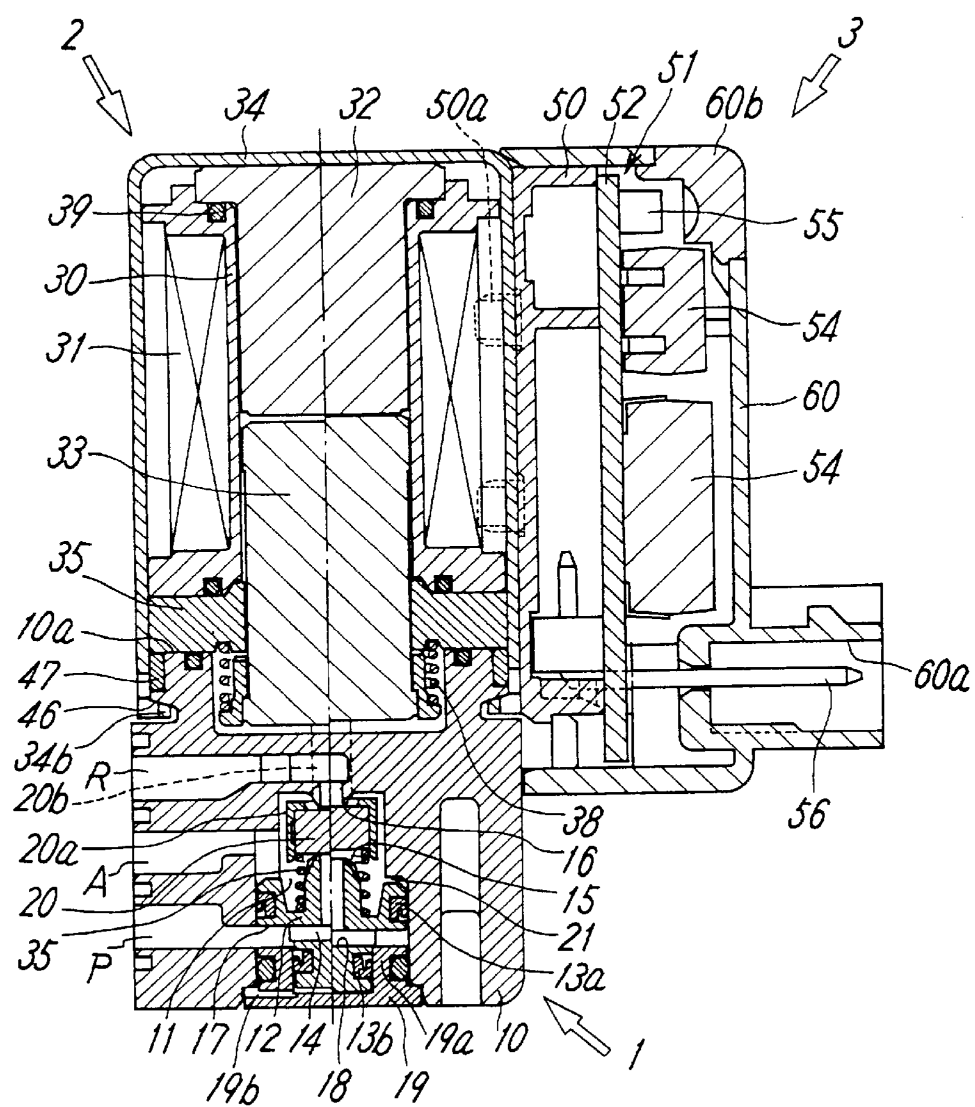
FIG. 1 is a side sectional view showing an embodiment of an electromagnetic valve according to the present invention, where left halves of a valve portion and a solenoid portion are shown as a de-energized state to the solenoid portion and right halves thereof are shown as an energized state.
Figure 2:
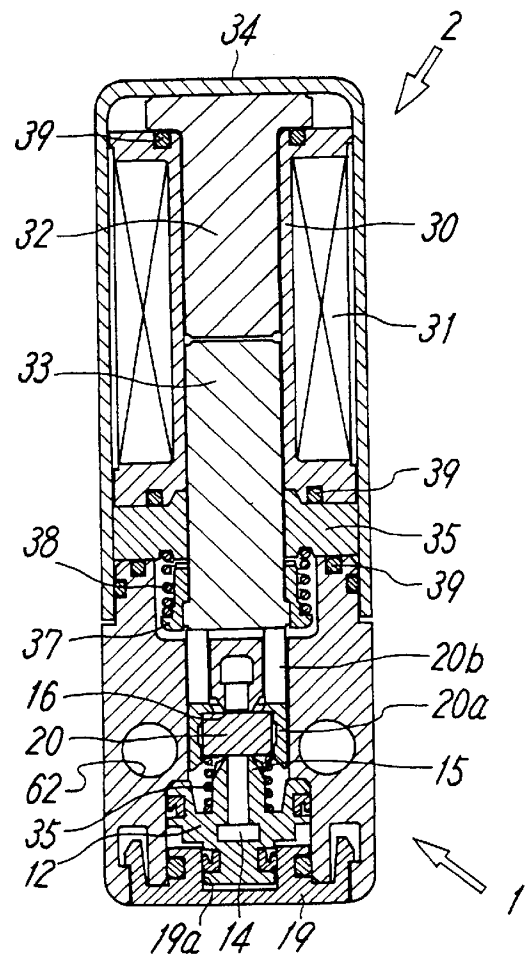
FIG. 2 is a longitudinal sectional view of the embodiment.
Figure 3:
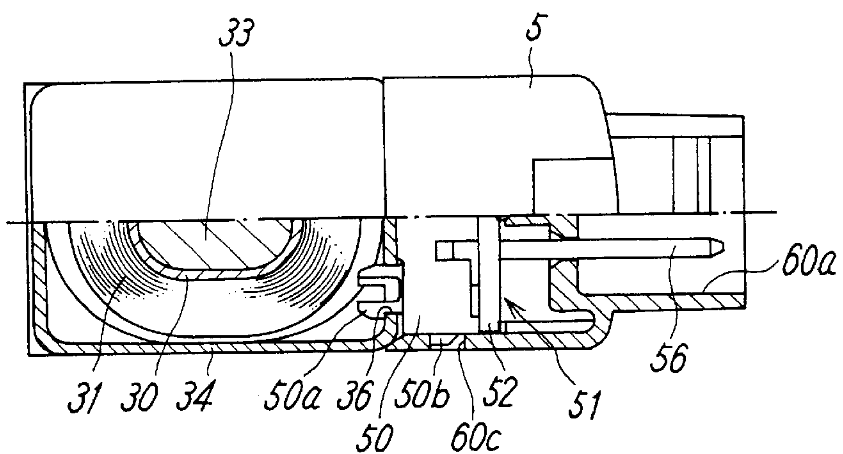
FIG. 3 is a partial plan and sectional view of the embodiment.

FIGS. 1 to 8 show a first embodiment of an electromagnetic valve according to the present invention, and the electromagnetic valve is generally provided with a valve portion 1 constituting a 3-port valve and a solenoid portion 2 which drives the valve portion and is further provided with a terminal box 3 which is additionally attached outside these members for current conduction to the solenoid portion 3.

A housing 10 of the valve portion 1 is formed from electrically insulating synthetic resin and is provided inside with a valve chamber 11 communicating with an input port P, an output port A and a discharge port R. The valve chamber 11 is formed by a valve hole opened from an end face opposed to a joining face 10*a* on the solenoid portion 2 in the housing 10. In the valve chamber 11, the input port P and the output port A opened at a side face of the housing 10 sequentially communicate with the valve chamber 11 from the opened end of the valve hole through the side face of the valve hole, and the discharge port R communicates with the valve chamber via a discharge valve seat 16 provided on a depth face of the valve hole. A valve seat body 12 provided with a flow path 14 communicating with the input port P and a supply valve seat 15 and a poppet valve body 20 which selectively approaches to/separates from the supply valve seat 15 and the discharge valve seat 16 are received in the valve chamber 11, and an end portion of the valve chamber is closed by a retaining plate 19.

The flow path 14 of the valve seat body 12 is provided so as to communicate with the input port P over the entire peripheral side faces of the valve seat body, and a diameter of a portion of the valve seat body 12 which extends from a portion where the flow path 14 of the valve seat body 12 is provided to a portion towards the retaining plate 19 is reduced, so that the diameter-reduced portion is fitted into a cylindrical valve seat body receiving portion 19*a* of the retaining plate 19. The other end of the flow path 14 communicates with the interior of the supply valve seat 15 opposed to the poppet valve body 20, seal members 13*a* and 13*b* which seals both sides of the flow path 14 are provided between the valve seat body 12 and an inner face of the valve chamber 11, and the valve seat body 12 is movable in an axial direction of the valve hole in a state where is sealed by these seal members. Incidentally, a space between the valve seat body 12 and the retaining plate 19 is opened to the outside through a ventilation hole 19*b*.

A range where the valve seat body 12 is movable to the side of the poppet valve body 20 is restricted by a stopper portion 21 formed in the valve chamber 11. The position of the stopper portion 21 is provided such that the supply valve seat 15 approaches to the poppet valve body 20 to stop when the poppet valve body 20 abuts on the discharge valve seat 16 by current conduction of the solenoid portion 2.

Also, the valve seat body 12 is provided in the flow path 14 with a first fluid pressure acting face 17 on which fluid pressure flowing from the input port P acts to press the valve seat body 12 towards the poppet valve body 20 and a second fluid pressure acting face 18 which presses the valve seat body 12 in a direction opposed thereto. A fluid pressure acting effective area of the first fluid pressure acting face 17 is set to be larger than that of the second fluid pressure acting face 18. The difference between these areas can be achieved by providing the diameter-reduced portion fitted into the valve seat body receiving portion 19*a* of the retaining portion 19 on the valve seat body 12 and forming the second fluid pressure acting face 18 facing the flow path 14 on the diameter-reduced portion.

Incidentally, here, the embodiment constituted such that the valve seat body 12 moves in the axial direction of the valve hole has been explained, but the valve seat body may be provided in a fixing manner, of course.

On the other hand, the poppet valve body 20 is disposed in the valve chamber 11 so as to be positioned between the supply valve seat 15 and the discharge valve seat 16, and it opens/closes their valve seats 15 and 16 according to current conduction to the solenoid portion 2 or stop thereof. Also, in order to conduct opening/closing operation of the poppet valve body 20 by the solenoid portion 2, a pair of push rods 20*b* integral with a cover 20*a* fitted on an outer peripheral portion of the poppet valve body 20 are disposed so as to be opposed to each other through the discharge valve seat 16, the push rods 20*b* are derived from a hole provided in the housing 10 towards the solenoid portion 2 (refer to FIG. 2) and their distal ends are caused to abut on a movable iron core 33 of the solenoid portion 2.

Also, a poppet spring 25 pressing the poppet valve body 20 towards the discharge valve seat 16 is interposed between the valve seat body 12 and the poppet valve body 20 around the supply valve seat 15 in the valve seat body 12. The biasing force of the poppet spring 25 does not exceed the biasing force occurring in the valve seat body 12 due to the area difference between the first and second fluid pressure acting faces 17 and 18 in the valve seat body 12.

As is clearly shown in FIGS. 1 to 3 and FIG. 7, the solenoid portion 2 is provided with a bobbin 30 on which a coil 31 has been wound, a fixed iron core 32 fitted into and fixed to the bobbin, a movable iron core 33 which is attracted to the fixed iron core 32 and is freely movable, a magnetic cover 34 which surrounds the periphery of the coil 31 to constitute an outer shell of the solenoid portion 2 and a magnetic plate 35 positioned between the magnetic cover 34 and the movable iron core 33, and it has a magnetic path around the coil 31.

The fixed iron core 32 and the movable iron core 33 are formed in an oval sectional shape or an elliptic sectional shape so as to be capable of generating magnetic attracting force efficiently, and central holes of the bobbin 30 and the magnetic plate 35 are also formed in a similar shape according to the shapes of the cores 32 and 33.

The magnetic cover 34 is for constituting the outer shell of the solenoid portion 2 to enclose the entire of the solenoid portion 2, and it is formed by a deep drawing process of ferromagnetic material (an iron plate). Here, mounting holes 36 for the terminal box 3 are formed in a side face of the cover, but the water-proof/drip-proof properties of the solenoid portion 2 can be secured by fixing the terminal box by means which does not block a liquid-tight property in the magnetic cover 34 such as bonding or the like without forming the holes 36.

Also, a pair of current conduction terminals 40 constituting the current conduction system to the solenoid body 2 is provided in the bobbin 30 (FIG. 7), and the terminals are directed towards an opening end of the magnetic cover 34 to be protruded towards the valve portion via a notched portion of the magnetic plate 35.

Furthermore, a ring 37 made from synthetic resin is fitted on an outside end of the movable iron core 33, and a return spring 38 for returning the movable iron core is confined between the ring 37 and the magnetic plate 35. The ring 37 is also provided with a function serving as a stopper for stopping the movable iron core 33 just before the movable iron core 33 is attracted to the fixed iron core 32. Incidentally, reference numeral 39 denotes a sealing material in the drawings.

Here, operation of the valve portion 1 will be explained briefly.

When the solenoid portion 2 of the electromagnetic valve is put in a de-energized state, as shown on a left half in FIG. 1, the poppet valve body 20 opens the discharge valve seat 16, and the output port A communicates with the discharge port R so that the valve chamber is put in a state where it has been opened to the atmosphere. On the other hand, the supply valve seat 15 has been closed by the poppet valve body 20. In this case, the pressure of air which has flown from the input port P to the flow path 14 of the valve seat body 12 acts on the first and second fluid pressure acting faces 17 and 18, but since the area of the first fluid pressure acting face 17 is larger than that of the second fluid pressure acting face 18, the valve seat body 12 is moved in a direction where it abuts on the stopper portion 21 in the housing 10, and the supply valve seat 15 occupies a position close to a position where the poppet valve body 20 occupies at an energizing time to the solenoid portion 2, and it has been closed by the poppet valve body 20 at that position.

In this state, when the solenoid portion 2 is energized, as shown on a right half in FIG. 1, the movable iron core 33 is attracted to the fixed iron core 32 to open the supply valve seat 15 and simultaneously close the discharge valve seat 16. At this time, since the supply valve seat 15 has been moved in advance up to a position close to a position occupied by the poppet valve body 20 at a time of current conduction, the movable iron core 33 may attract by a small stroke, so that an attracting force acting on the movable iron core 33 can be increase large or an attracting force required for opening a valve can be obtained by a small-sized solenoid and the supply valve seat 15 can easily be opened.

Thus, since, when the supply valve seat 15 is opened, compressed air flows in the valve chamber which is positioned on a secondary side of the valve seat through the supply valve seat 15, the valve seat body 12 is moved in a direction of separation from the poppet valve body 20 by a fluid pressure acting on the second fluid pressure acting face 18 so that the supply valve seat 15 is separated from the poppet valve body 20 to further increase the opening amount of the valve seat and an valve opening can be achieved so as to obtain a large flow rate.

Next, when the solenoid portion 2 is de-energized, the movable iron core 33 is returned back by the biasing force of the return spring 38 to close the supply valve seat 15 and simultaneously open the discharge valve seat 16. As a result, the valve seat body 12 moves towards the poppet valve body 20 due to the fluid pressure of the flow path 14 to abut on the stopper 21 and occupy a position where the movable iron core 33 is opened by a small stroke.

Figure 4:
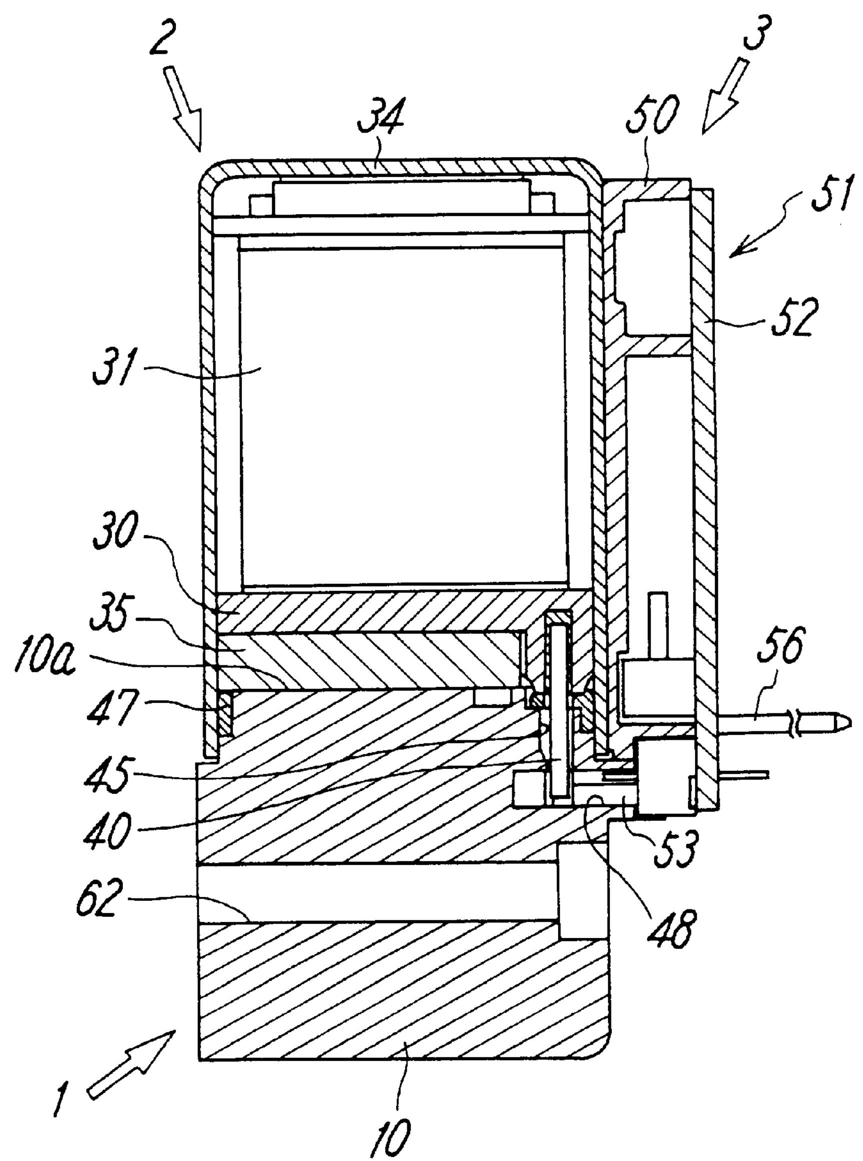
FIG. 4 is a sectional side view of a main portion of the embodiment, taken at a position (arrow A—A position in FIG. 5) different from a position shown in FIG. 1.
Figure 5:
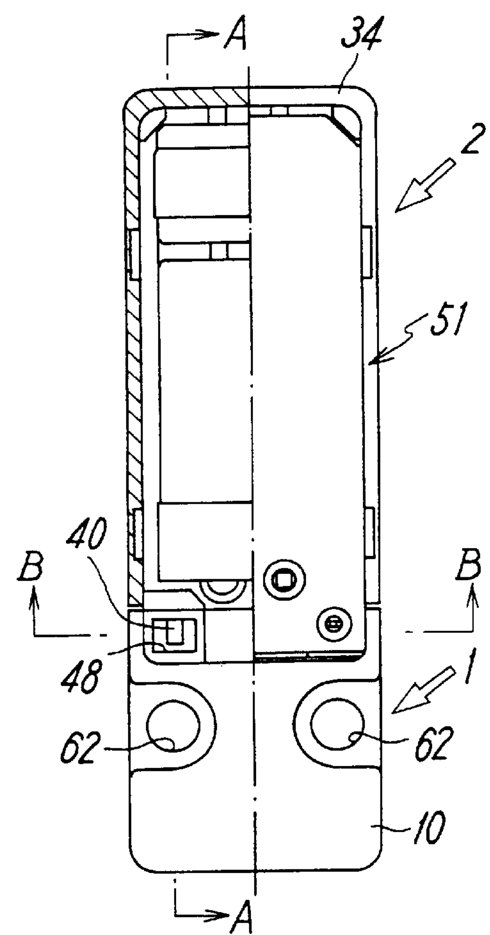
FIG. 5 is a partial longitudinal sectional view of the embodiment, taken at a position different from the position shown in FIG. 2.
Figure 6:
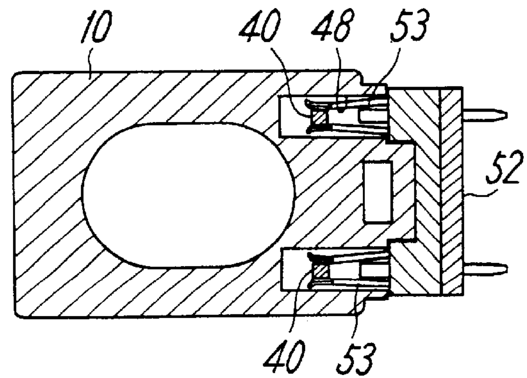
FIG. 6 is a partial plan and sectional view of the embodiment, taken at a position (arrow B—B position in FIG. 5) different from the position shown in FIG. 3.
Figure 7:
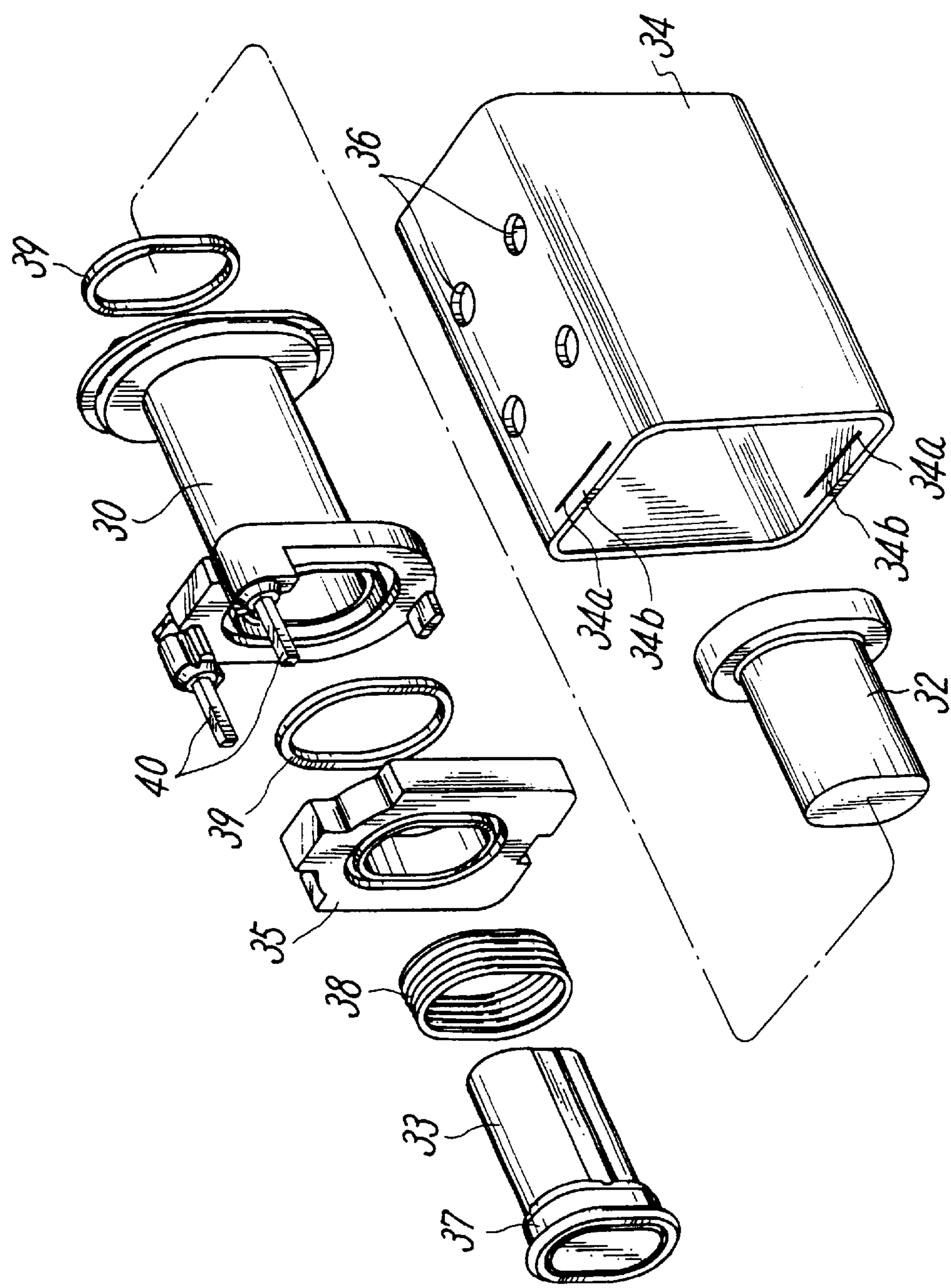
FIG. 7 is a dissolved perspective view showing a constitution of a solenoid portion of the embodiment.
Figure 8:
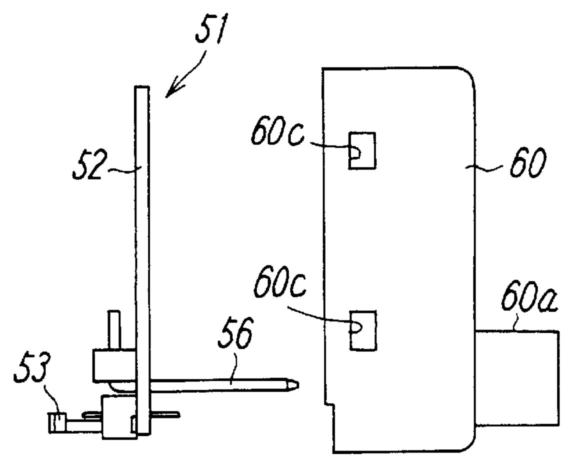
FIG. 8 is a side view showing a constitution of a board assembly and a terminal block cover in the embodiment.

As is clearly shown in FIGS. 4 to 6, terminal insertion holes 45 receiving the current conduction terminals 40 projecting from the bobbin 30 are provided in the joining face 10*a* of the housing 10 formed from electrically insulating synthetic resin to be joined to the solenoid portion 2, and the solenoid portion 2 and the valve portion 1 are fixed to each other in a state where the current conduction terminals 40 have been inserted in the terminal insertion holes 45. As shown in FIG. 1 and the like, it is preferable to perform fixation of the both by pressure-fitting engagement portions 34*b* formed by providing slits 34*a* in the magnetic cover 34 into recessed portions 46 provided in the housing 10, but the fixation may be performed by using other arbitrary means. Also, when the solenoid portion 2 and the valve portion 1 are fixed to each other, the solenoid portion 2 except for the mounting holes 36 for the terminal box 3 can be formed in a liquid-tight state by interposing a seal member 47 therebetween.

On the other hand, the terminal box 3 is fixed to the solenoid portion 2 utilizing the mounting holes 36 formed on the side face of the magnetic cover 34. The terminal box 3 is provided at its base portion with a terminal block 50 made from synthetic resin, and it is fixed to the magnetic cover by pressure-fitting elastically deformable projecting pieces 50*a* provided on the terminal block 50 into the mounting holes 36. A board assembly 51 is placed on the terminal block 50 and a connector cover 60 is attached to the terminal block so as to cover the board assembly 51. The board assembly 51 is structured such that, on a board 52 having printed wiring, contact terminals 53 which extend from the board up to positions of the conduction terminals 40 in the terminal insertion holes 45 to be electrically connected to the terminals, various electronic parts 54 for a conduction circuit including a lamp 55 for displaying current-conduction, conduction pins 56 for a connector connected to an external power source and the like are provided.

Incidentally, the terminal box 3 is not necessarily mounted on the solenoid portion 2, but it may be mounted on the housing in the valve portion 1 or may be mounted on both the valve portion and the solenoid portion 2.

The contact terminal 53 has a pair of resilient contact pieces holding the current-conducting terminal 40, it extends to the current-conducting terminal 40 in the terminal insertion hole 45 to be connected thereto by inserting the contact terminal 53 into the terminal insertion hole 45 of the housing 10 via the opening 48 from the outside of the housing (refer to FIG. 6). Also, a proximal portion of the current-conducting pin 56 for a connector is fixed to the board 52 and a distal end thereof extends in a connector connecting hole 60*a* of a connector cover 60.

Also, the connector cover 60 is basically for covering the entire of the board assembly 51 on which the various electronic parts 54 for a current-conducting circuit and the like have been mounted, and the connector cover is mounted on the terminal block by engaging protrusions 50*b* of the terminal block 50 with the engaging holes 60*c* (refer to FIG. 3), but the entire of the terminal box 3 can be formed in a liquid-tight manner as needs. The connector cover 60 is not only provided with a connector connecting port 60*a* for receiving the current-conducting pins 56 but also provided with a light transmissive lamp window 60*b* so as to be positioned outside of a lamp 55 for current-conduction display.

The current-conduction pin 56 can be protruded in any direction to extend in the connector connecting port 60*a* provided thereat so as to be adapted for a use aspect of the electromagnetic valve. For example, in the board assembly 51 of the embodiment shown in FIGS. 1 to 6 and FIG. 8, the current-conduction pin 56 is protruded in a direction perpendicular to a side face of the electromagnetic valve, the connector connecting port 60*a* in the connector cover 60 is provided in the direction, but such a structure can be employed that current-conduction pins 56A are protruded from the board 52 upwardly and the connector connecting port 60*a* of the connector cover 60 is provided in the direction, as a board assembly 51A shown in FIG. 9 and FIG. 11. Incidentally, any means can be employed for fixing the current-conduction pins 56 and 56A to the board 52. Furthermore, as a board assembly 51B shown in FIG. 10, such a configuration can be employed that lead wires 58 for current conduction are directly derived from the connector cover 60 without providing the current-conduction pins and the connector connecting port.

Incidentally, reference numeral 62 denotes a bolt hole for fixing the electromagnetic valve in the drawings.

Figure 9:
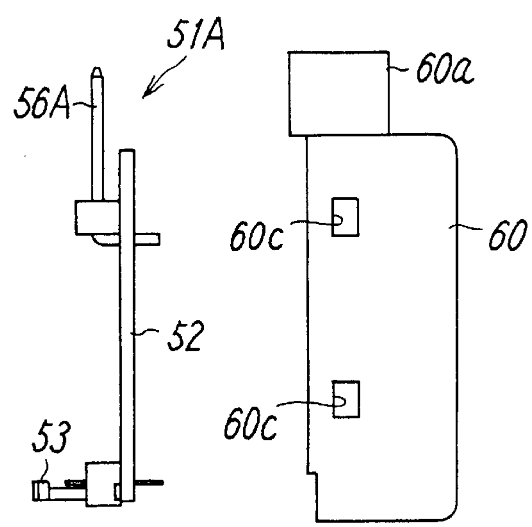
FIG. 9 is a side view showing a constitution of another board assembly and another terminal block cover utilized in the embodiment.
Figure 10:
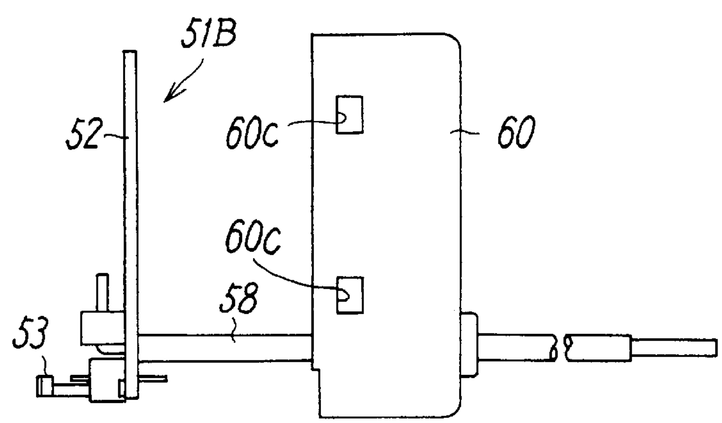
FIG. 10 is a side view showing a constitution of still another board assembly and still another terminal block cover utilized in the embodiment.
Figure 11:
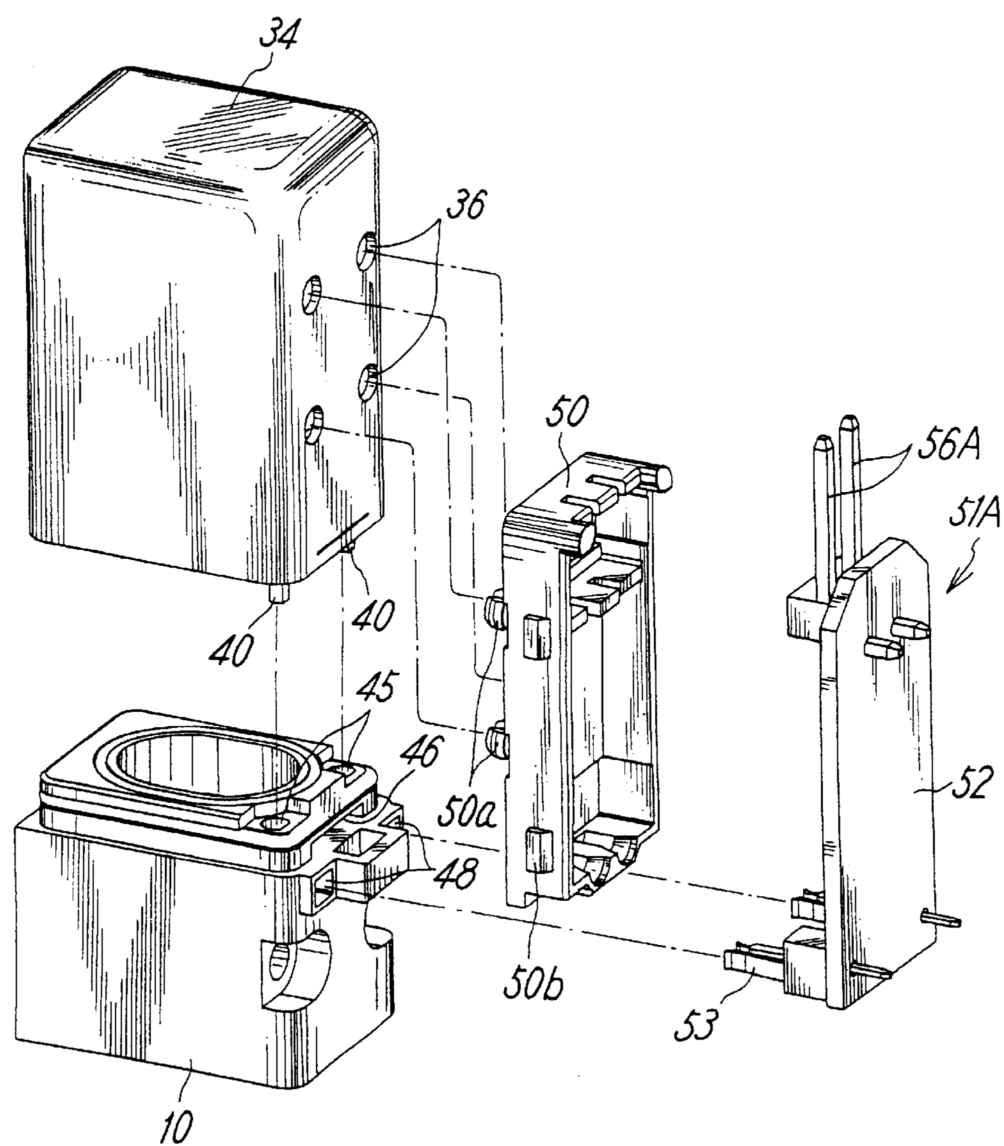
FIG. 11 is a dissolved perspective view of the electromagnetic valve of the present invention using the board assembly and the terminal block cover shown in FIG. 9.

FIG. 11 shows an appearance of an embodiment provided with the board assembly 51A shown in FIG. 9, but the connector cover 60 shown in the same figure is not illustrated. Incidentally, since the configuration of the embodiment shown in FIG. 11 other than the above is not different from a corresponding configuration of the embodiment shown in FIG. 1 to FIG. 7 which has been explained previously, same or corresponding portions in the embodiment are denoted by same reference numerals and explanation thereof will be omitted.

Figure 12:
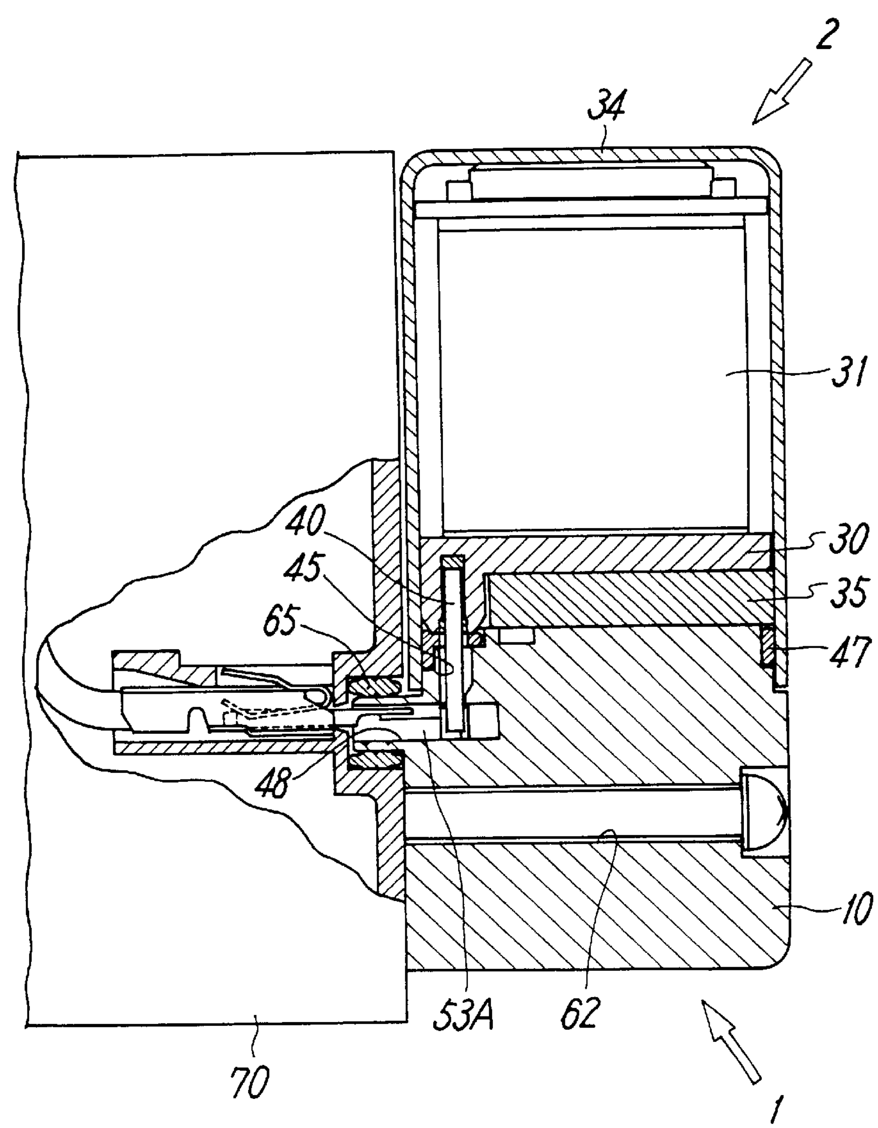
FIG. 12 is a sectional view of another embodiment of the present invention which is constituted as a water-proof type.

Also, FIG. 12 shows a constitution of an embodiment where an electromagnetic valve according to the present invention is made water-proof/drip-proof, and this embodiment is not basically provided with the terminal box 3 of the embodiment previously described and it is structured such that the electromagnetic valve is directly mounted on an electromagnetic valve mounting body 70 such as a piston plate, a sub-plate or the like. At this time, in order to allow connection of the fluid flow path and the current-conduction system to the electromagnetic valve mounting body 70 on the joining face simultaneously with mounting of the electromagnetic valve to the electromagnetic valve mounting body 70, an opening 48 through which contact terminals 53A for contacting with the current-conduction terminals 40 within the terminal insertion hole 45 in the housing 10 are inserted is provided on a side face of the housing having the input port P, the output port A and the discharge port R arranged in a row in the embodiment.

The contact terminal 53A is provided in the electromagnetic valve mounting body 70, and a member corresponding to the board assembly 51 in the previously described embodiment or the like is provided in the current-conduction system as needs. The structure of the contact terminal 53A itself is not substantially different from the case of the previously described embodiment.

Also, in this embodiment, as described above, the electromagnetic valve is configured as the water-proof/drip-proof type. For this reason, the solenoid portion 2 is enclosed by the magnetic cover 34 in a liquid-tight manner without providing the mounting hole 36 for the terminal box 3 in the magnetic cover 34 constituting the outer shell of the solenoid portion 2 like the previous embodiment, the seal member 47 is further interposed between the solenoid portion 2 and the valve portion 2 when the solenoid portion 2 and the valve portion 1 are fixed to each other, the periphery of the current conduction terminal 40 is also sealed by the seal member 47, and the periphery of the opening 48 for insertion of the contact terminals 53A, which is provided in the housing 10 is also sealed by the seal member 65. Accordingly, the electromagnetic valve itself is kept in a liquid-tight state.

In the electromagnetic valve having the above-described constitution, since the housing 10 is formed from electrically insulating synthetic resin, the solenoid portion 2 and the valve portion 1 are fixed to each other in the state that the current conduction terminals 40 to the solenoid portion 2 have been inserted in the terminal insertion hole 45 in the housing, and the contact terminals 53 and 53A provided to the external terminal box 3 or the like are brought into contact with the current conduction terminals 40 in the terminal insertion hole 45 by inserting the contact terminals 53 and 53A in the insertion hole 45 through the opening 48 communicating with the terminal insertion hole 45 of the housing 10, the constitution and assembling of the current conduction system to the solenoid portion 2 can be simplified. In addition, the housing 10 comprising the electrically insulating synthetic resin is utilized effectively and a function as a housing of a connecting portion of the current conduction terminals 40 and the contact terminals 53 and 53A is imparted to a portion of the housing 3, so that an insulating structure of the current conduction system of the housing 10 can remarkably be simplified to secure electrical insulation performance easily.

Furthermore, as the embodiment shown in FIG. 12, the electromagnetic valve can secure the water-proof/drip-proof properties of the solenoid portion 2 and the current conduction system thereof easily by liquid-tightly fixing the housing 10 to an opening end side of the magnetic cover 34 constituting the outer shell of the solenoid 2 to liquid-tightly enclose the solenoid portion and inserting the contact terminals 53 and 53A connected to the current conduction terminals 40 in the opening 48 of the housing in a liquid-tight manner, According to the electromagnetic valve of the present invention described above in detail, an electromagnetic valve can be provided where the constitution and assembling of a current conduction system to a solenoid portion can be simplified by utilizing an electrically insulation performance of a housing made from synthetic resin effectively, resulting in improvement of assembling easiness, and insulating properties of the solenoid portion and the current conduction system thereof can easily be secured, and an electromagnetic valve which can secure water-proof/drip-proof properties of a solenoid portion and its current conduction system easily can be obtained.

What is claimed is:

1. An electromagnetic valve comprising a valve portion having a valve body for switching flow paths according to approach to/separation from a valve seat within a valve main body and a solenoid portion which drives the valve body so as to approach to/separate from the valve seat, wherein the valve main body is formed from an electric insulating synthetic resin;

in a state where a current conduction terminal constituting a current conduction system of the solenoid portion has been inserted into a terminal insertion hole opened in a contact face with a solenoid in the valve main body, the solenoid portion and the valve portion are fixed to each other; and an opening for inserting a contact terminal that extends from the outside to the current conduction terminal in the terminal insertion hole to be electrically connected thereto is provided in the valve main body.

2. An electromagnetic valve according to claim 1, wherein the contact terminal is provided to a terminal box mounted to the valve portion and/or the solenoid portion.

3. An electromagnetic valve according to claim 2, wherein a terminal block constituting a base portion of the terminal box is fixed to the solenoid portion, and a connector for connecting the contact terminal connected to the current conduction terminal to an electronic part for a current conduction circuit and an external power source is provided in a board assembly mounted on the terminal block.

4. An electromagnetic valve according to claim 3, wherein a contact terminal for connecting to a current conduction terminal provided in the board assembly is formed by a pair of resilient contact pieces which are elastically inserted through an opening communicating with the terminal insertion hole of the solenoid in the valve main body from the outside of the valve main body to hold the current conduction terminal in the terminal insertion hole.

5. An electromagnetic valve according to claim 1, wherein a magnetic cover which is provided outside a coil in the solenoid is formed in such a shape as to constitute an outer shell of the solenoid portion and cover the solenoid portion in a liquid-tight manner; and the valve main body is fixed to an opening end side of the magnetic cover in a liquid-tight manner and the contact terminal connected to the current conduction terminal is inserted into an opening of the valve main body in a liquid-tight manner.

6. An electromagnetic valve according to claim 1, wherein a terminal block constituting a base portion of a terminal box is fixed to the solenoid portion, and a connector for connecting the contact terminal connected to the current conduction terminal to an electronic part for a current conduction circuit and an external power source is provided in a board assembly mounted on the terminal block.

7. An electromagnetic valve according to claim 6, wherein a contact terminal for connecting to a current conduction terminal provided in the board assembly is formed by a pair of resilient contact pieces which are elastically inserted through an opening communicating with the terminal insertion hole of the solenoid in the valve main body from the outside of the valve main body to hold the current conduction terminal in the terminal insertion hole.

* * * * *